July 18, 1944.  W. J. KNOCHEL ET AL  2,353,961
ATTACHMENT OF FILAMENTS TO THEIR SUPPORTS
Filed Dec. 3, 1942
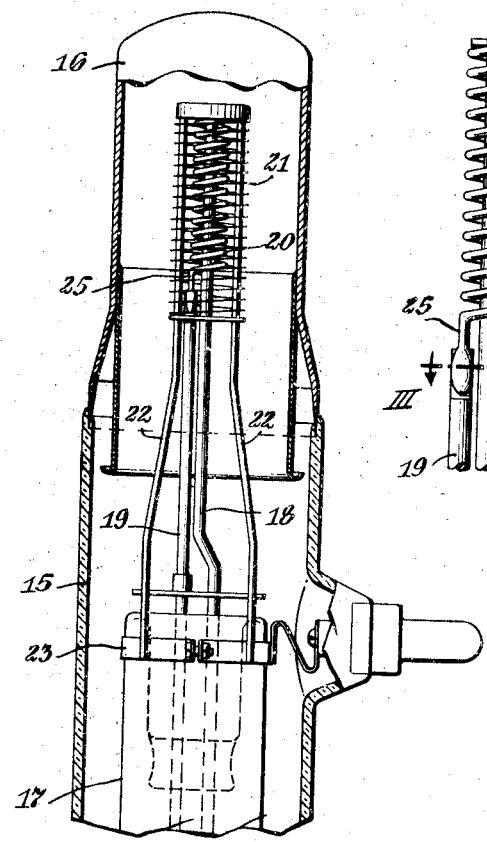
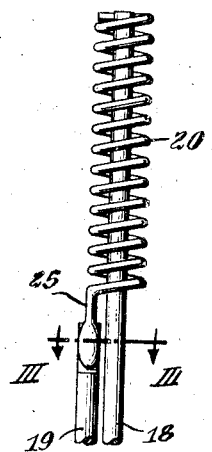
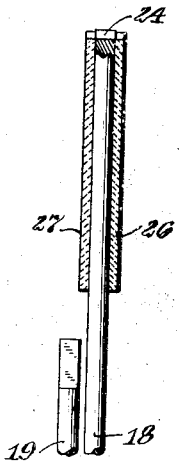
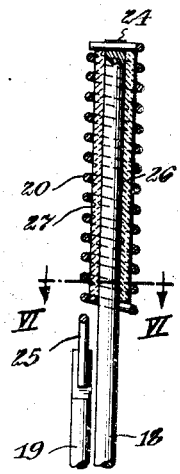
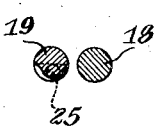
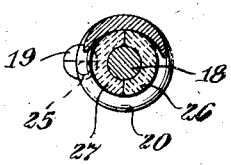
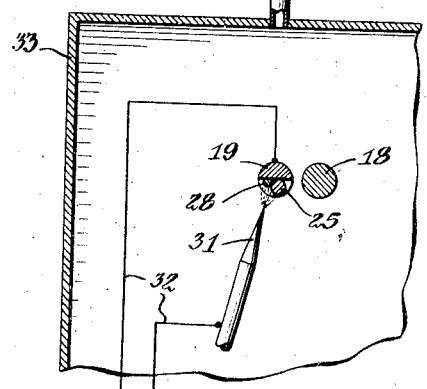
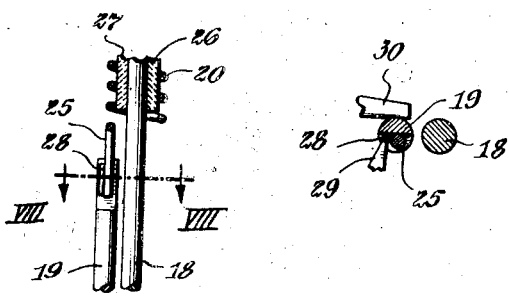
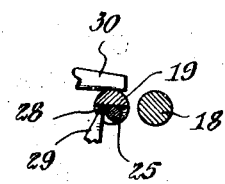
INVENTORS
W. J. KNOCHEL
H. F. BEYER
BY
ATTORNEY Patented July 18, 1944

2,353,961

UNITED STATES PATENT OFFICE 2,353,961

ATTACHMENT OF FILAMENTS TO THEIR SUPPORTS

William John Knochel, East Orange, and Herman Frederick Beyer, Clifton, N. J., assignors to Westinghouse Electric & Manufacturing Company, East Pittsburgh, Pa., a corporation of Pennsylvania Application December 3, 1942, Serial No. 467,692

3 Claims. (Cl. 250—27.5)

This invention relates to improvements in attachment of filament to its support, and while primarily involving the method as applied to radio tubes, likewise has a broader reference to filament mounting in general and to the resultant combination effected by utilization of the method involved.

It is usual practice in the art to form filaments of one kind of wire and to form the lead-in wires of another kind of wire, attaching the filament to the lead-in wires by welding the overlapping ends of the filament on the respective lead-in wires. The method heretofore employed has been performed by binding the overlapping ends of lead-in wire and filament together by a wrapping of a closely coiled tie wire, and thereafter arc welding the overlapped lead-in wire and filament. The tie wire is usually hand-wrapped and after welding is in such a state as to render itself useless as far as support is concerned, both of which circumstances are disadvantageous. Another disadvantage in this prior-art method is that the filament end is fixed during the welding operation by virtue of the binding effect of the tie wire, and therefore after welding is completed left in a strained condition which is apt to displace the filament from its desired concentric position, result in breakage and cause other undesirable or detrimental results.

In its general aspect, the present invention has for its object to overcome the difficulties attendant upon attachment of a filament to its support or lead-in wires as practiced in the prior art.

Likewise, from a general viewpoint, an object of the invention is to provide an improved method and improved resultant attachment of a filament to the support therefor.

More specifically, an object of the invention is to provide a method and structure wherein necessity for and inclusion of a tie wire is eliminated.

Another object of the invention is to provide a method and produce a product avoiding inherent strains in the assembled filament due to assembly steps.

A further object of the invention is to improve the character of weld obtained between the filament wire and the lead-in or support wire for the filament.

Yet another object of the invention is to overcome the necessity for and presence of tedious and expensive hand winding of a tie wire.

Still further objects of the invention will appear as the description progresses, both by direct recitation thereof and by implication from the context.

Referring to the accompanying drawing in which like numerals of reference indicate similar parts throughout the several views:

Figure 1 is a sectional view of an electron discharge device wherein the filament mounted in accordance with the present invention is shown in elevation;

Figure 2 is an elevation of a filament mounted on its lead-in or support wires in accordance with our invention;

Figure 3 is a cross-section on line III—III of Fig. 2;

Figure 4 is an elevation of the support wires on the longer one of which is shown the centering fixture employed during fabrication;

Figure 5 is a view similar to Fig. 4 and showing the filament situated around the centering fixture;

Figure 6 is a cross-section on line VI—VI of Fig. 5;

Figure 7 is a view similar to a lower portion of Fig. 5 and showing the weld-forming material applied next the filament;

Figure 8 is a cross-section on line VIII—VIII of Fig. 7 and showing the spot-welding electrodes applied to the weld-forming material for securing that material in place; and Figure 9 is a sectional view also on the line VIII—VIII of Fig. 7 and showing the further step in the process of arc-welding the filament to its support or lead-in wire.

In the specific embodiment of the invention illustrated in said drawing, the reference numeral 15 designates an evacuated envelope of which a part of the exterior wall also constitutes an anode 16 sealed at its rim with respect to the other or glass portion of the envelope. The glass portion of the envelope has a re-entrant stem 17 through which are sealed upwardly disposed lead-in wires or supports 18, 19 for the filament 20 which in this showing also constitutes the cathode. Around the cathode is a grid 21 the convolutions of which are secured to upright supports 22 the lower ends of which are fast upon a collar 23 clamped on said stem 17. It is to be understood that although, for purposes of being definite, the invention is described with respect to the present showing of an electron discharge device, said invention is applicable with respect to other forms of envelopes, anodes and grids.

In the instant description of the structure and of the mode and manner of fabricating the same, reference will be made to the cathode or filament assembly which, as herein referred to, comprises the filament and its lead-in or supporting wires. One of the supporting wires, 18, is longer than the other one, 19, and extends coaxially through a coiled filament 20. The upper end of this central or coaxial support 18 is shown to be diametrically notched at 24 and receives the end portion of the filament which is likewise situated diametrically of the generally cylindrical configuration of the coil. Said end of the filament resting in the notch is welded in place thereby supporting the upper end of the filament in fixed position.

The lower end of the filament is bent downwardly at the perimeter of the coil and constitutes an attaching leg 25. It is this leg which has heretofore been bound by a tie wire. According to the present invention support 19 has a length such that it overlaps part of the length of said filament leg and is preferably flattened at its side next said leg. Furthermore the association of parts is such that the said leg is, before attachment to the support, normally juxtaposed to said flattened part of the support so as to require no distortion when securing it in place thereagainst. In order to properly and definitely situate the filament concentric with the center support and the end of the filament against the flattened portion of the other or off-set support, a temporary fixture of tubular character is situated between the filament and the central support. As shown, this fixture is composed of semi-cylindrical segments 26, 27 of approximately the length of the cylindrical part of the filament. In carrying out the method of manufacture, these segments are applied in position at opposite sides of the central support 18 and the filament is then slid down over the said segments around the support after which the upper end of the filament is welded or otherwise secured to the upper end of the support. The depending leg 25 of the filament is in surface contact with the flattened portion of the off-set support 19 as a result of carrying out the above described steps of fabrication.

In further carrying forward the method of manufacture, a short length of weld-forming material 28 is secured to the flattened portion of the off-set support in close proximity to the filament leg. Attention in this connection is directed to Figures 7 and 8. The material used may be molybdenum wire of less length than the flattened portion of the support and of less diameter than said support. This weld-forming material is first preferably spot-welded in position on the support next the filament leg, spot-welding electrodes 29, 30 for the purpose being illustrated as applied in Fig. 8. Then, as shown being done in Fig. 9, the weld-forming material is arc-welded with respect to both the support and the filament by an appropriate welding electrode 31 and welding circuit 32. The weld may be performed in a chamber 33 containing suitable gas, such as hydrogen, for purposes of obtaining a weld without forming undesirable oxides. After the welding is completed, as shown done in Figures 1, 2 and 3, the sections of the centering fixture may then be removed. First one section thereof is removed and then the other, the first section to be removed being the one at the side of the central support which is away from the offset support. Said section is slid down the support and removed, after which the other section may be revolved so as not to overlie the offset support and is then slid down the central support and removed.

As a result of fabrication in accordance with the above disclosure of our invention, the filament is not placed under any strains in positioning the same upon the central support and not under any strains in locating the depending leg in juxtaposition to the support to be attached thereto, nor under any strain as a result of being attached to the support. The weld-forming material is present only at the face where the welding is to be performed, not only utilizing minimum material for the purpose but avoiding an increase of diameter around the support to which it is applied and thus avoiding any lessening of clearance between the two supports. Tedious and uncertain hand winding of the prior art tie wires is avoided and greater accuracy and ruggedness of assembly is obtained by the present method and structure.

We claim:

1. A method of fabricating a filament assembly comprising applying a tubular fixture around one support, applying the filament over said fixture and welding the end of the filament to the end of said support, juxtaposing and welding the other end of the filament to the other filament support, and thereafter removing said fixture from between the filament and support.

2. A method of fabricating a filament assembly comprising applying a tubular fixture around one support, applying the filament over said fixture and welding the end of the filament to the end of said support, juxtaposing and welding the other end of the filament to the other filament support, and thereafter sectionally removing said fixture from between the filament and support.

3. A filament assembly comprising a pair of supports of which one is longer than the other, a coiled filament coaxial with the longer of said supports and around the same, said filament and longer of said supports being secured together at their upper ends, said filament having a lower end leg portion depending from the coil and juxtaposed to and overlapping the upper end portion of the shorter of said supports, said shorter support being flattened on its side toward said filament, and weld-forming material securing the end portion of the filament on the flattened portion of said support.

WILLIAM JOHN KNOCHEL.
HERMAN FREDERICK BEYER.